United States Patent [19]

El-Sahfei

[11] Patent Number: 4,781,077
[45] Date of Patent: Nov. 1, 1988

[54] STABLE INTERSHAFT SQUEEZE FILM DAMPER

[75] Inventor: Aly El-Sahfei, Cambridge, Mass.

[73] Assignee: Massachusetts Institute of Technology, Cambridge, Mass.

[21] Appl. No.: 944,548

[22] Filed: Dec. 19, 1986

[51] Int. Cl.[4] .......................... F16F 15/10; G05G 1/00
[52] U.S. Cl. ..................................... 74/573 F; 74/572; 74/574
[58] Field of Search ................. 74/572, 573 R, 573 F, 74/574; 384/520, 901

[56] References Cited

U.S. PATENT DOCUMENTS

| | | | |
|---|---|---|---|
| 3,950,897 | 4/1976 | Birkenstack et al. | 74/573 F |
| 4,002,086 | 1/1977 | Reinhall | 74/573 F |
| 4,109,549 | 8/1978 | Vincent | 74/573 F |
| 4,134,309 | 1/1979 | Balke et al. | 74/573 F |
| 4,200,003 | 4/1980 | Miller | 74/573 F |
| 4,269,451 | 5/1981 | Narang | 74/573 F |

FOREIGN PATENT DOCUMENTS

| | | | |
|---|---|---|---|
| 976217 | 10/1975 | Canada | 384/520 |
| 3102726 | 8/1982 | Fed. Rep. of Germany | 74/573 F |
| 608295 | 9/1960 | Italy | 384/901 |
| 0068533 | 4/1958 | Japan | 74/573 F |
| 1231413 | 5/1986 | U.S.S.R. | 74/573 F |

OTHER PUBLICATIONS

Qihan, Li et al., "Investigation of the Steady State Response of a Dual Rotor System with Inter-Shaft Squeeze Film Damper", ASME Paper 85-IGT-39, Sep. 1, 1985.
Cunningham et al., "Design of a Squeeze Film Damper for a Multi-Mass Flexible Rotor", ASME Paper #75-DET-40, 5/23/1975.
Courage, "Experimental Study of an Inter-Shaft Squeeze Film Bearing", I. Mech. E. 1980, pp. 375–380.
D. H. Hibner et al., "Analytical and Experimental, etc., Part 1: Demonstration of Instability," *J. Engr. Pwr.*, vol. 99, No. 1, Jan. 1977, pp. 47–52.
D. H. Hibner et al., "Analysis, etc., Part 2: Control of Instability," *J. Mech. Design*, Jul. 1978, pp. 558–562.
Qihan Li et al., "Investigation of the Transient Response etc.," AS ME Paper 85-IGT-38, 1985.
A. Z. Szeri et al., "Linear Force Coefficients for Squeeze Film Dampers," ASME Paper 82-Lub-30, 1982.

Primary Examiner—Gary L. Smith
Assistant Examiner—Vinh Luong
Attorney, Agent, or Firm—Wolf, Greenfield & Sacks

[57] ABSTRACT

A dual shaft rotating assembly typically used in aircraft engines is provided with a stable intershaft squeeze film damper for reducing vibration. The assembly includes a housing, a first shaft rotatable about an axis of rotation, a second shaft concentric with the first shaft and rotatable about the same axis of rotation, bearings for supporting each of the shafts from the housing, a squeeze film damper positioned between the shafts and including an annular region containing an oil film for attenuating vibration, and apparatus for maintaining the damping fluid stationary relative to the housing. The squeeze film damper includes an inner ring and an outer ring which define the annular region between them. A first intershaft bearing is coupled between the first shaft and the inner ring, and a second intershaft bearing is coupled between the second shaft and the outer ring. The inner and outer rings are maintained stationary by squirrel cages coupled to the housing. The stationary oil film provides stable damping for all practical rotating speeds of the shafts.

16 Claims, 3 Drawing Sheets $W_1 > W_2$ STABLE $W_1 < W_2$: UNSTABLE

STABLE FOR ANY $W_1$

STABLE INTERSHAFT SQUEEZE FILM DAMPER

FIELD OF THE INVENTION

This invention relates to a dual shaft rotating assembly and, more particularly, to a dual shaft rotating assembly having a stable intershaft squeeze film damper for attenuating vibration. The dual shaft rotating assembly is used in aircraft engines, but is not limited to such use.

BACKGROUND OF THE INVENTION

Vibration is often a problem in rotating machinery wherein a shaft rotates in a set of bearings. Vibration damping devices including an oil film in an annular space between the outer race of a bearing and the housing have been utilized. When the shaft moves off the bearing axis, the oil film exerts a damping force on the shaft. These damping devices are known as "squeeze film dampers."

In certain rotating machinery, such as aircraft engines, it is customary to utilize a dual shaft configuration wherein a first shaft rotates about an axis of rotation at one angular speed, and a second shaft concentric with the first shaft rotates about the same axis of rotation at a second angular speed. The two shafts are mounted by means of bearings to the housing, or frame of the machinery, so that they can rotate independently. Each of the shafts in the dual shaft assembly is subject to vibration. In some cases, the rotating shafts can become unstable, resulting in damage to the machine.

Squeeze film dampers have been proposed for use between the inner and outer shafts in a dual shaft configuration. The intershaft squeeze film damper suppresses relative movements of the two shafts, thereby reducing vibration. In the past, the intershaft squeeze film damper has been constructed as an annular oil film associated with either the inner race or the outer race of the intershaft bearing. The annular space which contains the damping oil film is defined by the surfaces of two concentric rings. When the intershaft squeeze film damper is associated with the inner race of the intershaft bearing, the damper, including the oil film, rotates at the speed of the inner shaft. When the squeeze film damper is associated with the outer race of the intershaft bearing, the oil film rotates at the speed of the outer shaft.

The intershaft squeeze film damper has been effective in reducing vibration levels at relatively low angular speeds of the two shafts. However, it has been found that the squeeze film damper produces instabilities at rotating speeds above a predetermined level. The range of speeds in which the instabilities occur is a function of the mass and stiffness of the two shafts. As a result, the usefulness of intershaft squeeze film dampers has been limited since instability often occurs at operating speeds of interest.

It is a general object of the present invention to provide an improved dual shaft rotating assembly.

It is another object of the present invention to provide a dual shaft rotating assembly having a stable intershaft squeeze film damper for attenuating vibration.

It is yet another object of the present invention to provide an intershaft squeeze film damper which is stable regardless of the rotating speeds of the two shafts.

It is still another object of the present invention to provide an intershaft squeeze film damper wherein the damping fluid does not rotate.

SUMMARY OF THE INVENTION

According to the present invention, these and other objects and advantages are achieved in a dual shaft rotating assembly having a stable intershaft squeeze film damper for attenuating vibration. The assembly comprises a housing, a first shaft rotatable about an axis of rotation, a second shaft concentric with the first shaft and rotatable about the same axis of rotation, means for supporting each of the shafts from the housing while permitting each of the shafts to rotate independently, squeeze film damper means positioned between the first shaft and the second shaft and defining an annular region containing a damping fluid for attenuating vibration of the shafts, and means for maintaining the damping fluid stationary relative to the housing.

Preferably, the maintaining means includes a first intershaft bearing between the first shaft and the squeeze film damper means, a second intershaft bearing between the second shaft and the squeeze film damper means, and means for coupling the squeeze film damper means to the housing.

In a preferred embodiment, the squeeze film damper means includes an inner ring coupled to the first intershaft bearing and having an outer surface, and an outer ring coupled to the second intershaft bearing and having an inner surface, the outer surface and the inner surface defining the annular region which contains the damping fluid. Preferably, the maintaining means includes an inner squirrel cage coupled between the inner ring and the housing, and an outer squirrel cage coupled between the outer ring and the housing.

By maintaining the intershaft squeeze film damping fluid stationary relative to the housing, stable damping is achieved for all practical operating speeds of the first shaft and the second shaft.

BRIEF DESCRIPTION OF THE DRAWINGS

For a better understanding of the present invention, together with the foregoing and other and further objects, advantages and capabilities thereof, reference is made to the accompanying drawings which are incorporated herein by reference and in which.

DESCRIPTION OF THE PRIOR ART

Figure 1A:
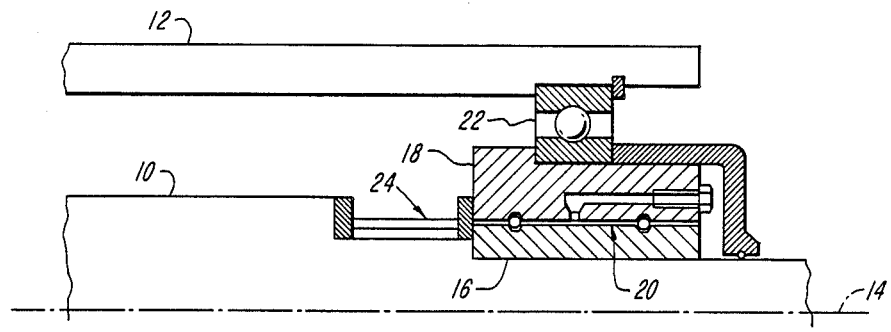
FIGS. 1A and 1B are partial cross-sectional views of intershaft squeeze film bearings in accordance with the prior art.

One configuration of an intershaft squeeze film damper in accordance with the prior art is shown in FIG. 1A. An inner shaft 10 and a concentric outer shaft 12 both rotate about an axis of rotation 14. The assembly has circular symmetry about the axis of rotation 14. A squeeze film damper, including an inner ring 16 connected to the inner shaft 10, and a concentric outer ring 18 define an annular region 20. The annular region 20 contains a film of damping oil. A ball bearing assembly 22 has an inner race connected to the outer ring 18 and an outer race connected to the outer shaft 12. A squirrel cage 24 connects the outer ring 18 to the inner shaft 10, while providing some flexibility.

In operation, the inner shaft 10 and the components of the squeeze film damper rotate at a first angular speed, and the outer shaft 12 rotates at a second angular speed. The ball bearing assembly 22 permits rotation of the shafts 10 and 12 at different speeds. In this configuration, the oil film of the squeeze film damper rotates at the same angular speed as the inner shaft 10.

Figure 1B:
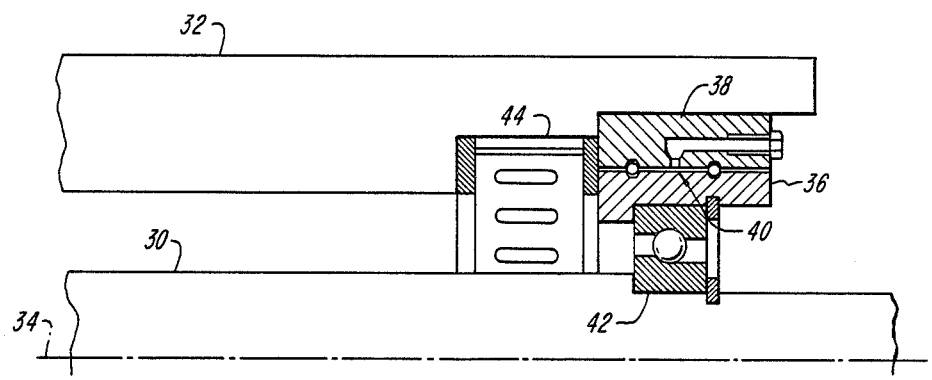

An alternate prior art configuration of an intershaft squeeze film damper is shown in FIG. 1B. An inner shaft 30 and a concentric outer shaft 32 rotate about an axis of rotation 34. A squeeze film damper includes an inner ring 36 and a concentric outer ring 38 connected to the outer shaft 32. The inner ring 36 and the outer ring 38 define an annular region 40 which contains a film of damping oil. A ball bearing assembly 42 includes an inner race connected to the inner shaft 30 and an outer race connected to the inner ring 36. The inner ring 36 is also connected through a squirrel cage 44 to the outer shaft 32.

In operation, the outer shaft 32 and the squeeze film damper rotate at one angular speed, while the inner shaft 30 rotates at a second angular speed. The squeeze film damping oil rotates at the speed of the outer shaft 32. The configurations of FIG. 1A and 1B differ primarily in that the squeeze film damper rotates with the outer shaft 32 in FIG. 1B and rotates with the inner shaft 10 in FIG. 1A.

DETAILED DESCRIPTION OF THE INVENTION

Figure 2A:
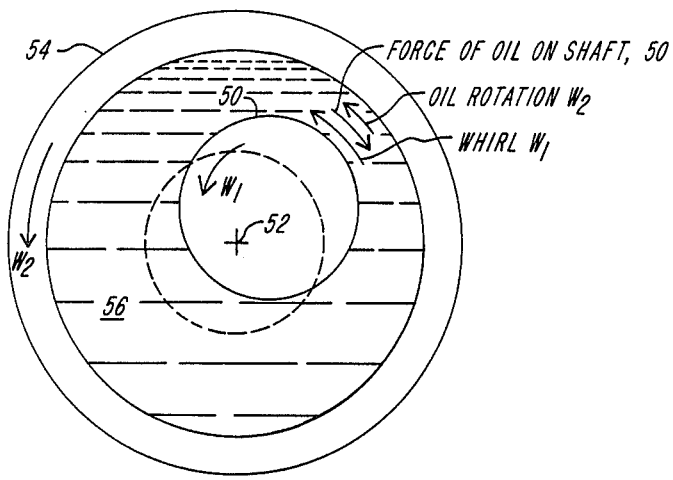
FIG. 2A is a schematic illustration of an intershaft squeeze film bearing operating in a stable mode.

It has been determined that shaft instabilities are a function of the speed of rotation of the damping oil film and the rate of shaft whirl. Refer to FIG. 2A, which provides schematic representation of a dual shaft rotating assembly. An inner shaft 50 rotates about an axis of rotation 52 at a first angular speed $W_1$, and an outer shaft 54, concentric with the axis of rotation 52, rotates at a second angular speed $W_2$. Vibration results in the inner shaft 50 being displaced from the axis of rotation 52, as shown in FIG. 2A. In rotating machinery, vibration is commonly referred to as "whirl" since the displaced inner shaft 50 revolves around the axis of rotation 52. Thus, the actual center of inner shaft 50 traces a circle about the nominal axis of rotation 52 as it whirls at a rate $w_1$. The whirl can be in either direction relative to the direction of shaft rotation. The squeeze film damper between the inner shaft 50 and the outer shaft 54 is represented, with a greatly exaggerated dimension, as the space 56 between the shafts 50 and 54, which space is filled with damping oil. A force is exerted on the inner shaft 50 by the damping oil as the shaft 50 whirls. The force includes both radial and circumferential components. The circumferential component determines stability.

In the case where the squeeze film damper rotates with the outer shaft 54 (FIG. 1B), the oil in the region 56 rotates at the same angular speed $W_2$ as the outer shaft 54. When the rate of whirl $w_1$ of the inner shaft 50 is greater than the angular speed $W_2$, then the oil exerts a drag force on the inner shaft 50 which inhibits or reduces the tendency for whirl.

Figure 2B:
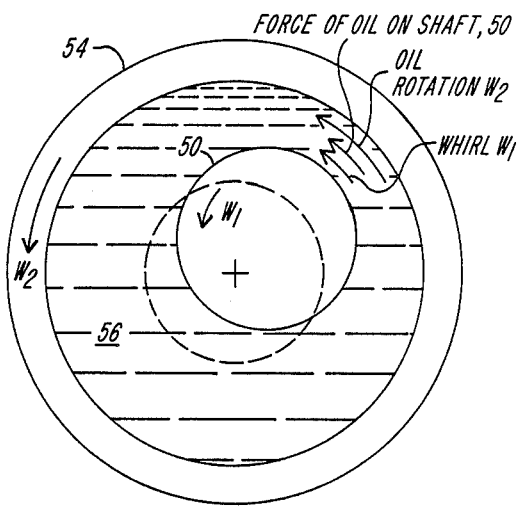
FIG. 2B is a schematic illustration of an intershaft squeeze film damper operating in an unstable mode.

In the case where the damping oil rotates at an angular speed $W_2$ greater than the rate of whirl $w_1$ of the inner shaft 50, then the oil exerts a force on the inner shaft 50 which enhances or worsens the tendency for whirl. This case is illustrated in FIG. 2B. The inner shaft 50 is, in effect, pushed in the direction of whirl by the faster-moving oil, thereby causing the whirl, or vibration, to become more pronounced. This is an unstable condition.

Similar conditions occur when the damping oil film rotates at the speed $W_1$ of the inner shaft. In either case, when the damping oil film rotates with one shaft at an angular speed greater than the rate of whirl of the shaft assembly, an unstable condition is produced.

Figure 2C:
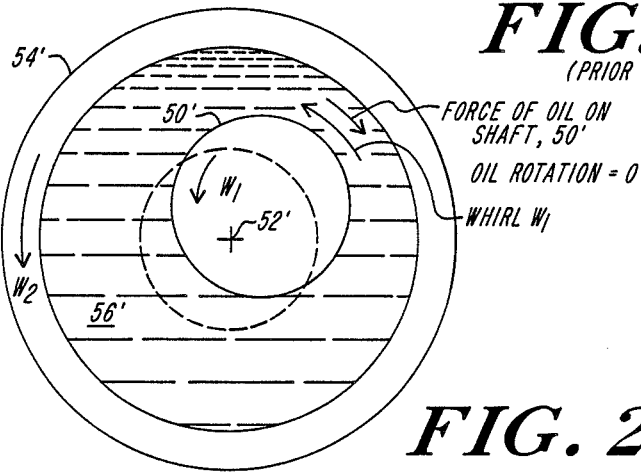
FIG. 2C is a schematic illustration of an intershaft squeeze film damper operating in accordance with the present invention.

It has been determined that instability due to the squeeze film damper enhancing, or worsening, the whirl of the shaft assembly can be eliminated by providing an intershaft squeeze film damper wherein the damping oil film is maintained stationary relative to the housing of the assembly. This configuration is illustrated schematically in FIG. 2C. An inner shaft 50' rotates about an axis of rotation 52' at a first angular speed $W_1$, and an outer shaft 54', concentric with the axis of rotation 52', rotates at a second angular speed $W_2$. Oil fills a space 56', shown with greatly exaggerated dimensions, between shafts 50' and 54'. In this situation, the damping oil film inhibits the tendency for the shaft assembly to whirl, regardless of the rotating speed.

Figure 3:
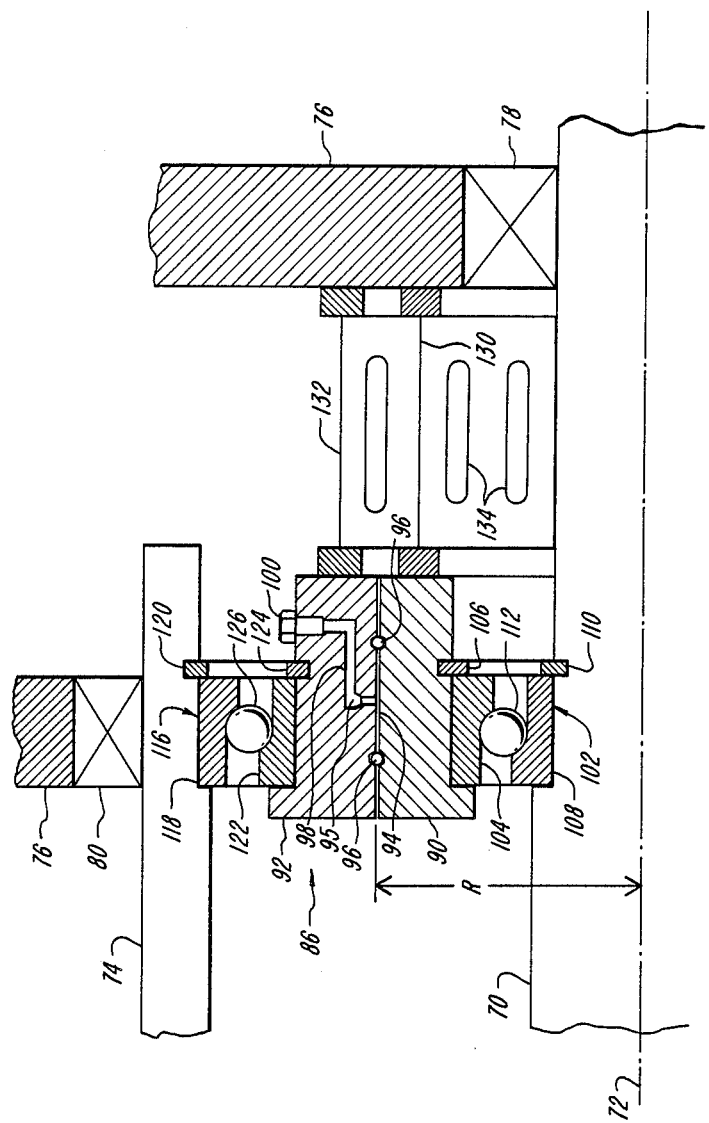
FIG. 3 is a partial cross-sectional view of a dual shaft rotating assembly in accordance with the present invention.

Such a dual shaft rotating assembly, in accordance with the present invention, is shown in FIG. 3. An inner shaft 70 rotates about an axis of rotation 72 at a first angular speed. An outer shaft 74, concentric with the inner shaft 70, rotates about the axis of rotation 72 at a second angular speed. The configuration illustrated in FIG. 3 has circular symmetry about the axis of rotation 72. A typical application of the dual shaft rotating assembly is in an aircraft engine, wherein the inner shaft is driven by a low pressure turbine, while the outer shaft is driven by a high pressure turbine.

The assembly includes a stationary frame, or housing, 76 which supports the inner shaft 70 and permits rotation thereof by means of a ball bearing assembly 78 positioned between the housing 76 and the inner shaft 70. A ball bearing assembly 80 positioned between the housing 76 and the outer shaft 74 supports the outer shaft 74 and permits rotation thereof. The ball bearing assemblies 78, 80 are shown schematically in FIG. 3 and can be of conventional design. Typically, each of the shafts 70, 74 is supported by two or more ball bearing assemblies spaced along its length.

Positioned between the inner shaft 70 and the outer shaft 74 is a squeeze film damper 86 mounted to permit rotation of the outer shaft 74 at a different speed than the inner shaft 70. The squeeze film damper 86 is maintained stationary relative to the housing 76. The squeeze film damper 86 includes an annular inner ring 90 and an annular outer ring 92, concentric with the inner ring 90. The rings 90 and 92 define between them a thin, annular region 94 which contains a damping fluid, such as an oil of predetermined viscosity. Air can also be used as the damping fluid. Typically, the clearance C between the inner ring 90 and the outer ring 92 is in the range of about $C/R = 10^{-4}$, where R is the radius of the annular region 94. The annular region 94 can be sealed to prevent escape of the damping oil by O-rings 96 positioned in annular O-ring grooves in the inner ring 90 and the outer ring 92. Damping oil 95 is introduced into the annular region 94 through a passage 98 in outer ring 92. The passage 98 is sealed with a plug 100. In an alternative embodiment, the annular region 94 can be connected by suitable passages through the rings 90 and 92 to an oil circulation and cooling system that circulates and cools the oil and prevents heat buildup in the damper.

An intershaft ball bearing assembly 102 is connected between the inner ring 90 and the inner shaft 70 so as to permit the inner shaft 70 to rotate while the inner ring 90 remains stationary. An outer race 104 of ball bearing assembly 102 is secured in a recess in inner ring 90 by a retainer 106, while an inner race 108 is secured in a recess in inner shaft 70 by a retainer 110. The bearing assembly 102 includes bearing balls 112 which permit relative rotation between the outer race 104 and the inner race 108. An intershaft ball bearing assembly 116 is connected between outer ring 92 and outer shaft 74 so as to permit the outer shaft 74 to rotate while the outer ring 92 remains stationary. An outer race 118 of ball bearing assembly 116 is secured in a recess in outer shaft 74 by a retainer 120. An inner race 122 of bearing assembly 116 is secured in a recess in outer ring 92 by a retainer 124. The bearing assembly 116 contains bearing balls 126 which permit rotation of outer shaft 74 relative to outer ring 92.

The inner ring 90 of the squeeze film damper 86 is connected to the housing 76 by a squirrel cage 130, while the outer ring 92 is connected to the housing 76 by a squirrel cage 132 concentric with the squirrel cage 130. The squirrel cages 130 and 132 provide a semi-rigid connection to the housing 76 so as to prevent rotation of the rings 90 and 92 which define the squeeze film damper 86. The squirrel cages 130 and 132, however, have flexibility which permits some movement of the squeeze film damper 86. Typically, the squirrel cages 130 and 132 are in the form of thin cylinders having walls which are perforated by openings 134 to reduce their rigidity. The connections between the rings 90, 92 and the housing 76 can have configurations other than squirrel cages. The requirement is for connections which prevent rotation.

In operation, the dual shaft assembly shown in FIG. 3 permits both the inner shaft 70 and the outer shaft 74 to rotate independently in the same direction or in opposite directions and at any practical speed without the introduction of instability by the squeeze film damper.

While there has been shown and described what is at present considered the preferred embodiment of the present invention, it will be obvious to those skilled in the art that various changes and modifications may be made therein without departing from the scope of the invention as defined by the appended claims.

What is claimed is:

1. A dual shaft rotating assembly having a stable intershaft squeeze film damper for attenuating vibration, comprising:
   a housing;
   a first shaft rotatable about an axis of rotation;
   a second shaft concentric with said first shaft and rotatable about said axis of rotation;
   means for supporting each of said shafts from said housing while permitting each of said shafts to rotate independently;
   squeeze film damper means positioned between said first shaft and said second shaft and defining an annular region containing a damping fluid for attenuating vibration of said first shaft and said second shaft; and
   means for maintaining said damping fluid stationary relative to said housing.

2. A dual shaft rotating assembly as defined in claim 1 wherein said maintaining means comprises
   a first intershaft bearing between said first shaft and said squeeze film damper means, and
   a second intershaft bearing between said second shaft and said squeeze film damper means.

3. A dual shaft rotating assembly as defined in claim 2 wherein said maintaining means further includes means for coupling said squeeze film damper means to said housing.

4. A dual shaft rotating assembly as defined in claim 2 wherein said squeeze film damper means includes an inner ring coupled to said first intershaft bearing and having an outer surface, and an outer ring coupled to said second intershaft bearing and having an inner surface, said outer surface and said inner surface defining said annular region.

5. A dual shaft rotating assembly as defined in claim 4 wherein said maintaining means further includes an inner squirrel cage coupled between said inner ring and said housing and an outer squirrel cage coupled between said outer ring and said housing.

6. A dual shaft rotating assembly as defined in claim 4 further including means for supplying said damping fluid to said annular region.

7. A dual shaft rotating assembly as defined in claim 6 further including means for sealing said annular region to prevent leakage of said damping fluid therefrom.

8. A dual shaft rotating assembly as defined in claim 7 wherein said damping fluid comprises oil.

9. A dual shaft rotating assembly as defined in claim 2 wherein said first intershaft bearing and said second intershaft bearing each comprise a rolling element bearing.

10. A dual shaft rotating assembly as defined in claim 2 wherein said first shaft and said second shaft rotate in opposite directions relative to said housing.

11. A dual shaft rotating assembly as defined in claim 2 wherein said first shaft and said second shaft rotate in the same direction.

12. A dual shaft rotating assembly having a stable intershaft squeeze film damper for attenuating vibration, comprising:
   a housing;
   a first shaft for rotation at a first angular speed about an axis of rotation;
   first bearing means for supporting said first shaft from said housing and for permitting rotation of said first shaft relative to said housing;
   a second shaft concentric with said first shaft for rotation at a second angular speed about said axis of rotation;
   second bearing means for supporting said second shaft from said housing and for permitting rotation of said second shaft relative to said housing;
   squeeze film damper means positioned between said first shaft and said second shaft and defining an annular region containing a damping fluid;
   a first intershaft bearing between said first shaft and said squeeze film damper means;
   a second intershaft bearing between said second shaft and said squeeze film damper means; and
   means for preventing rotation of said squeeze film damper means relative to said housing.

13. A dual shaft rotating assembly as defined in claim 12 wherein said squeeze film damper means includes an inner ring coupled to said first intershaft bearing and having an outer surface, and an outer ring coupled to said second intershaft bearing and having an inner surface, said outer surface and said inner surface defining said annular region.

14. A dual shaft rotating assembly as defined in claim 13 wherein said rotation preventing means includes an inner squirrel cage coupled between said inner ring and said housing and an outer squirrel cage coupled between said outer ring and said housing.

15. A dual shaft rotating assembly as defined in claim 13 further including means for supplying said damping fluid to said annular region.

16. A dual shaft rotating assembly as defined in claim 15 further including means for sealing said annular region to prevent leakage of said damping fluid therefrom.

* * * * *